(12) United States Patent
Liu et al.

(10) Patent No.: US 12,084,524 B1
(45) Date of Patent: Sep. 10, 2024

(54) METHOD FOR EXTRACTING CHONDROITIN SULFATE FROM EGGSHELL MEMBRANE

(71) Applicant: Hebei University of Engineering, Handan (CN)

(72) Inventors: Meiyu Liu, Handan (CN); Hengyang Liu, Handan (CN); Haiping Lian, Handan (CN); Yuxin Yin, Handan (CN); Shaoqi Song, Handan (CN); Xiaoxu Guo, Handan (CN)

(73) Assignee: HEBEI UNIVERSITY OF ENGINEERING, Handan (CN)

( * ) Notice: Subject to any disclaimer, the term of this patent is extended or adjusted under 35 U.S.C. 154(b) by 0 days.

(21) Appl. No.: 18/648,414

(22) Filed: Apr. 28, 2024

Related U.S. Application Data

(63) Continuation of application No. PCT/CN2023/141921, filed on Dec. 26, 2023.

(30) Foreign Application Priority Data

Jan. 13, 2023 (CN) .................. 202310041266.X

(51) Int. Cl.
*C08B 37/00* (2006.01)

(52) U.S. Cl.
CPC ................ *C08B 37/0069* (2013.01)

(58) Field of Classification Search
None
See application file for complete search history.

(56) References Cited

FOREIGN PATENT DOCUMENTS

| CN | 104140477 A | 11/2014 |
|---|---|---|
| CN | 105440158 A | 3/2016 |
| CN | 106478842 A | 3/2017 |
| CN | 113150185 A | 7/2021 |
| CN | 114031695 A | 2/2022 |

OTHER PUBLICATIONS

Luan Xin-Yue, "Extraction and application of eggshell membrane polysaccharide," May 2016.
First Office Action for China Application No. 202310041266.X, mailed Aug. 31, 2023.
Liu Guo-Qing et al., "Optimization of Extraction Technology of Chondroitin Sulfate from Eggshell Membrane," 2007, pp. 283-286, vol. 28, No. 09.
Liu Ning et al., "Papain Extracting Chondroitin Sulfate of Eggshell Membrane," Farm Products Processing, Jul. 2015.
Liu Tao et al., "Use of Response Surface Analysis for Optimization of Extraction Process of Chondroitin Sulfate from Egg Shell Membrane," Packaging Engineering, Sep. 2019, pp. 48-55, 40, 17.
Notification to Grant Patent for China Application No. 202310041266.X, mailed Nov. 1, 2023.
First Search Report for China Application No. 202310041266.X, dated Aug. 31, 2023.
Supplementary Search Report for China Application No. 202310041266.X, dated Oct. 27, 2023.

*Primary Examiner* — Layla D Berry
(74) *Attorney, Agent, or Firm* — Piloff Passino & Cosenza LLP; Rachel K. Piloff; Sean A. Passino

(57) ABSTRACT

A method for extracting chondroitin sulfate from eggshell membrane is disclosed in the present disclosure, belonging to the technical field of biochemical agents. The method for extracting chondroitin sulfate from eggshell membrane includes following steps: adding a mixed reagent into ultra-micro-pulverized eggshell membrane, followed by water bath extraction; and centrifuging an extractive solution to obtain the chondroitin sulfate; the mixed reagent includes an alkali reagent and a salt reagent, and an alkali-salt ratio of the alkali reagent and the salt reagent is (3-7) mL:1 mL; the material-liquid ratio of the mixed reagent to the ultramicro-pulverized eggshell membrane is 1 g:(13-17) mL.

4 Claims, 11 Drawing Sheets

METHOD FOR EXTRACTING CHONDROITIN SULFATE FROM EGGSHELL MEMBRANE

CROSS-REFERENCE TO RELATED APPLICATIONS

This application is a continuation of PCT/CN2023/141921, filed Dec. 26, 2023 and claims priority of Chinese Patent Application No. 202310041266.X, filed on Jan. 13, 2023, the entire contents of which are incorporated herein by reference.

TECHNICAL FIELD

The present disclosure belongs to the technical field of biochemical agents, and particularly relates to a method for extracting chondroitin sulfate from eggshell membrane.

BACKGROUND

The consumption of poultry egg products is increasing worldwide as people's living standard improves, and a large amount of discarded eggshells are produced subsequently, resulting in great environmental pollution and waste of resources. There are a lot of available resources in eggshells, including calcium, active peptides, proteins and other components, with high value of utilization. Over the years of progressively deepened research on discarded eggshells, people gradually learned the importance of the development and utilisation of such a resource, which not only contributes to the improvement of the increasingly serious environmental problems by turning wastes into treasures, but also improves the added value of eggs and promotes the development of the deep processing industry of eggshells, obtaining double benefits at the same time.

As a type of glycosaminoglycan covalently attached to proteins to form proteoglycans, chondroitin sulfate is a white powder that is odourless, hygroscopic and viscous when exposed to water, and appears widely in animal tissues, cell surfaces and cell matrices. Chondroitin sulfate is used widely as a dietary supplement to protect joints and other cartilaginous tissues, providing good relief from joint discomfort and other symptoms. Also, it is effective in anti-coagulation, sedation, anti-tumour, anti-oxidation, blood lipid regulation, etc., and is therefore widely used in the food, medical and cosmetic industries. The demand for chondroitin sulfate has been increasing in recent years, and the products with chondroitin sulfate as the research object are of great prospect.

At present, chondroitin sulfate is extracted from animal cartilage tissues by high temperature steaming, which destroys the connective tissues of animals, and then chondroitin sulfate is extracted by alkaline digestion or enzyme digestion. Eggshell membrane contains a certain amount of chondroitin sulfate, and the extraction of chondroitin sulfate from discarded eggshell membrane makes full use of eggshell resources and turns waste into treasure as compared with the extraction from animal cartilage tissues, while the eggshell membrane is simple to obtain and rich in raw materials, which may also directly increase the output of chondroitin sulfate. Currently, various methods are available for extracting chondroitin sulfate from eggshells, and the common methods include alkali extraction method, alkaline enzyme method, and alkaline salt method, with no difference in the extraction rate of chondroitin sulfate. LIU Tao et al. extracted chondroitin sulfate from eggshell membrane by alkaline salt method with 74% extraction rate (LIU Tao, ZHANG Tiepeng, LUAN Xinyue, LIU He, LIU Ning. *Use of Response Surface Analysis for Optimization of Exraction Process of chondroitin sulfate from Egg Shell Membrane* [J]. *Packaging Engineering,* 2019,40(17):48-55.); LIU Ning et al. extracted chondroitin sulfate by enzyme extraction method, using the nature of papain hydrolysis of eggshell plasma to separate chondroitin sulfate from glycoproteins for chondroitin sulfate extraction, and the extraction rate of this process was 75.31%, which was slightly higher than that of the alkaline salt method (LIU Ning, LUAN Xinyue, LIU Tao, et al. *Papain Extracting chondroitin sulfate of Eggshell Membrane* [J]. *Fram Products Processing,* 2015(13):1-4+7.); and LIU Guoqing et al. processed eggshell membrane by diluted alkali method and carried out the extraction by dual enzyme method, using a combination of trypsin and pepsin, and the extraction rate of chondroitin sulfate was 76% under this process (LIU Guoqing, LING Qingzhi, SUN Junfei. *Optimization of Extraction Technology of chondroitin sulfate from Eggshell Membrane* [J]. *Food Science,* 2007(09): 283-286.). Compared to the extracting processes thereof, the alkali salt method for extracting chondroitin sulfate involves a relatively simple process and a low extraction cost, but the extraction rate is low, therefore, it is a technical problem that needs to be solved urgently in this field to improve the extraction rate of the alkali salt method and to achieve mass production.

SUMMARY

In order to solve the above problems in the prior art, the present disclosure provides a method for extracting chondroitin sulfate from eggshell membrane.

To achieve the above objectives, the present disclosure the following technical schemes.

A method for extracting chondroitin sulfate from eggshell membrane, including following steps: adding a mixed reagent into ultramicro-pulverized eggshell membrane, followed by water bath extraction; and centrifuging an extractive solution to obtain the chondroitin sulfate.

Optionally, the mixed reagent is a mixed solution of alkali reagent and salt reagent, where the alkali reagent is a sodium hydroxide solution with a volume fraction of 2%, and the salt reagent is 2% sodium chloride solution by volume; an alkali-salt ratio of the alkali reagent to the salt reagent is (3-7) milliliters (mL):1 mL.

More optionally, the alkali-salt ratio of the alkali reagent to the salt reagent is 6 mL:1 mL.

Optionally, a material-liquid ratio of the mixed reagent to the ultramicro-pulverized eggshell membrane is 1 gram (g):(13-17) mL.

More optionally, the material-liquid ratio of the mixed reagent to the ultramicro-pulverized eggshell membrane is 1 g:15.5 mL.

Optionally, a preparation method of the ultramicro-pulverized eggshell membrane includes following steps:
 (1) soaking eggshells in water, then tearing off eggshell membranes attached to inner walls of the eggshells, and collecting for later use; and
 (2) drying, crushing, sieving and ball milling the eggshell membranes collected in step (1) to obtain the ultramicro-pulverized eggshell membrane.

Optionally, in the step (1), a soaking duration is 2 hours (h).

Optionally, in the step (2), a drying temperature is 50 degrees Celsius (° C.) and a drying duration is 2 h; a crushing duration is 30 seconds (s); the sieving includes sieving through a 60-mesh sieve; a ball-to-material ratio of the ball milling is 7:1, a rotating speed is 500×g, and a ball milling duration is 180 minutes (min).

Optionally, a temperature of the water bath extraction is 30-70° C., with a duration of 2-10 h.

More optionally, the temperature of the water bath extraction is 59° C. and the duration is 7.3 h.

Optionally, a rotational speed of the centrifuging is 4000×g and a duration is 10 min.

Compared with the prior art, the present disclosure has the following beneficial effects:

the method for extracting chondroitin sulfate from eggshell membrane disclosed in the present disclosure involves firstly ultramicrocrushing the eggshell membrane, and then extracting the chondroitin sulfate from the eggshell membrane by using alkali reagent and salt reagent, which effectively improves the extraction rate of the chondroitin sulfate, and the extraction rate is up to 89.85%; and the present disclosure uses one-way experiment and response surface experiment to optimise the extraction process conditions, and obtains that the optimal process conditions for the extraction of chondroitin sulfate from eggshell membrane are as follows: the material-liquid ratio of the eggshell membrane to the mixed reagent is 1:15.5, the extraction temperature is 59° C., the alkali-salt ratio is 6:1, and the extraction duration is 7.3 h.

BRIEF DESCRIPTION OF THE DRAWINGS

In order to more clearly illustrate the technical schemes in the embodiments or prior art of the present disclosure, the accompanying drawings to be used in the embodiments are briefly described below, and it is obvious that the accompanying drawings in the following description are only some of the embodiments of the present disclosure, and that for a person of ordinary skill in the field, other accompanying drawings can be obtained based on these drawings without creative labour.

DETAILED DESCRIPTION OF THE EMBODIMENTS

Figure 1:
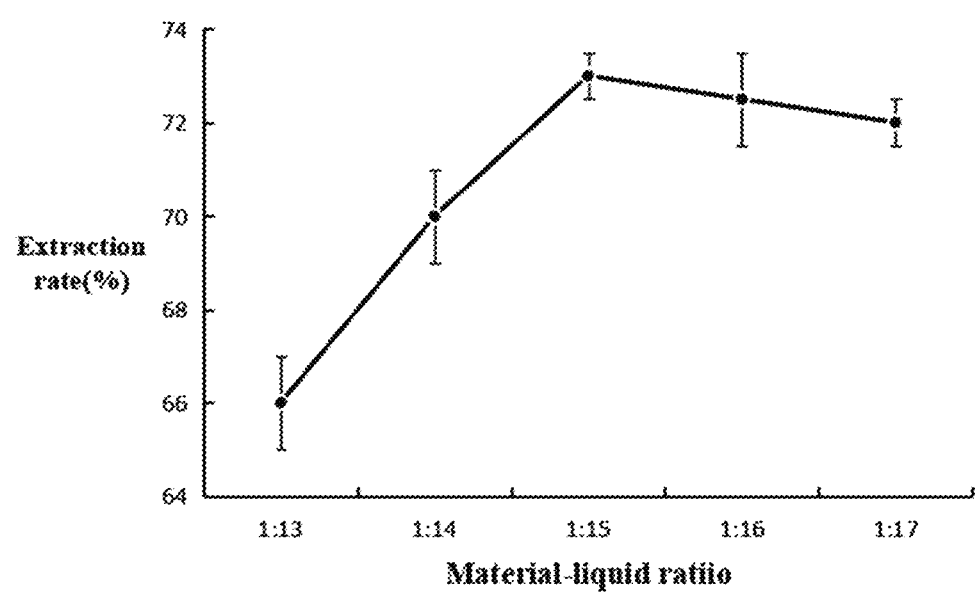
FIG. 1 shows extraction rates of chondroitin sulfate extracts obtained in Embodiments 1 to 5 of the present disclosure.

A number of exemplary embodiments of the present disclosure are now described in detail, and this detailed description should not be considered as a limitation of the present disclosure, but should be understood as a more detailed description of certain aspects, characteristics and embodiments of the present invention. It should be understood that the terminology described in the present disclosure is only for describing specific embodiments and is not used to limit the present disclosure.

In addition, for the numerical range in the present invention, it should be understood that each intermediate value between the upper limit and the lower limit of the range is also specifically disclosed. The intermediate value within any stated value or stated range and every smaller range between any other stated value or intermediate value within the stated range are also included in the present disclosure. The upper and lower limits of these smaller ranges may be independently included or excluded from the range.

Unless otherwise specified, all technical and scientific terms used herein have the same meaning as commonly understood by one of ordinary skill in the art to which this disclosure relates. Although the present disclosure only describes the preferred methods and materials, any methods and materials similar or equivalent to those described herein can also be used in the practice or testing of the present disclosure. All documents mentioned in this specification are incorporated by reference to disclose and describe methods and/or materials related to the documents. In case of conflict with any incorporated document, the contents of this specification shall prevail.

It is obvious to those skilled in the art that many improvements and changes may be made to the specific embodiments of the present disclosure without departing from the scope or spirit of the present disclosure. Other embodiments will be apparent to the skilled person from the description of the disclosure. The description and embodiments of that present disclosure are exemplary only.

The terms "comprising", "including", "having" and "containing" used in this specification are all open terms, which means including but not limited to.

In the following embodiments, fresh eggshells are collected in the Meishilin Industrial Park, Handan City, Hebei Province, P.R. China;

the chemical reagents used in the following embodiments are analytically pure;

the electronic balance used in the following embodiments is purchased from Shanghai Jingmi Scientific Instrument Co., Ltd.; the sampling sieves used are purchased from Daohui Zhangxing Yarn Sieve Factory in Shangyu City, Zhejiang Province; the high-speed pulverizer is a swinging traditional Chinese medicine pulverizer purchased from Xinchang Deke Machinery Co., Ltd.; the air blast drying box is an electric air blast drying box purchased from Shanghai Bozhen Instrument and Equipment Manufacturing Factory; the centrifuge is a high-speed freezing centrifuge purchased from Guangdong Foheng Instrument Co., Ltd.; and the vertical square ball mill used is purchased from Hunan Chuangweilai Electromechanical Equipment Manufacturing Co., Ltd.

Figure 11:
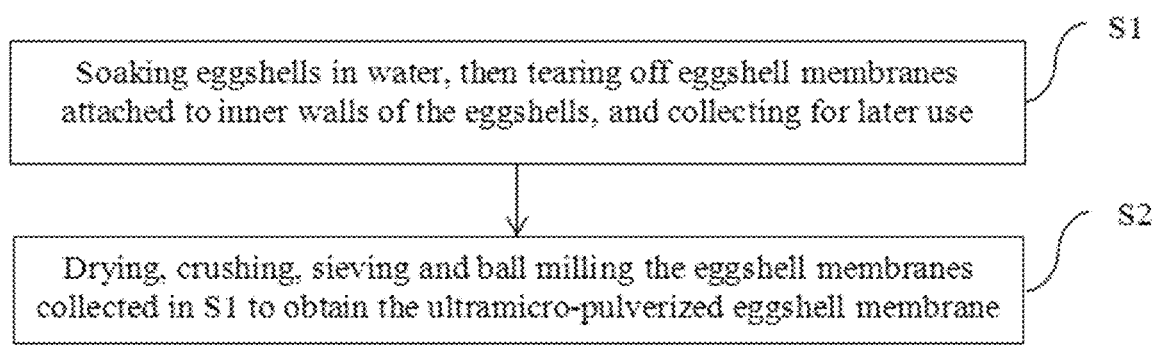
FIG. 11 shows a preparation method of an ultramicropulverized eggshell membrane according to the present disclosure.

In the following embodiments, a preparation method of an ultramicro-pulverized eggshell membrane as shown in FIG. 11 is as follows:

1) soaking fresh eggshells in distilled water for 2 hours (h), then manually tearing off eggshell membranes attached to inner walls of the eggshells, and collecting for later use;
2) placing the eggshell membranes collected in step 1) in a blast drying oven and drying at 50 degrees Celsius (° C.) for 2 h; crushing the eggshell membranes dried in a high-speed pulverizer for 30 seconds (s), and sieving with a 60-mesh sampling sieve; and treating the eggshell membranes crushed and sieved with diluted hydrochloric acid (a concentration of the diluted hydrochloric acid is 0.5 mol/L) to remove residual eggshells, filtering, washing the eggshell membranes on the sieve with clean water, air drying, and ball milling in a vertical square ball mill to obtain the ultramicro-pulverized eggshell membrane, where a ball-to-material ratio is 7:1, a speed of the ball milling is 500×g, and a duration is 180 minutes (min).

Embodiment 1

Extraction of Chondroitin Sulfate from Eggshell Membrane
1) 1 g (accurate to 0.01 g) of ultramicro-pulverized eggshell membrane is taken and placed in a conical flask, then 13 mL of mixed reagent (i.e. the material-liquid ratio is 1 g:13 mL) is added into the conical flask, and the bottle mouth is sealed with plastic wrap, where the mixed reagent is a mixture of alkali reagent and salt reagent, and the alkali reagent is a sodium hydroxide solution with a volume fraction of 2%, the salt reagent is 2% sodium chloride solution by volume, and the alkali-salt ratio is 3 mL:1 mL.
2) the conical bottle with the bottle mouth sealed in step 1) is placed in a water bath pot at 50° C. for water bath extraction for 6 h;
3) the extract obtained in step 2) is poured into a 50 mL centrifuge tube and placed in a centrifuge, with the rotational speed of the centrifuge set at 4000×g for 10 min, and the supernatant is the chondroitin sulfate extract;
4) according to the volume ratio of chondroitin sulfate extract: anhydrous ethanol in the chondroitin sulfate extract obtained in step 3) of 1:30, anhydrous ethanol is added to carry out a primary alcoholic precipitation, the precipitate is collected and added to the primary alcoholic precipitation and an equal amount of anhydrous ethanol to carry out a secondary alcoholic precipitation, and the secondary alcoholic precipitation is collected and dehydrated and dried, and the solid chondroitin sulfate is obtained.

The extraction rate of chondroitin sulfate from the chondroitin sulfate extract obtained in Embodiment 1 is determined by the following methods.
Method for Determining Extraction Rate of Chondroitin Sulfate
(1) Plotting of polysaccharide standard curve:20 mg of standard glucose is accurately weighed with an electronic balance, and the weighed glucose is added to distilled water and loaded into a 500 mL volumetric flask, and then dripped to the scale line with a rubber-tipped dropper, and then shaken well and left to stand by; a pipette gun is used to suck up 0.4 mL, 0.6 mL, 0.8 mL, 1.0 mL, 1.2 mL, 1.4 mL, 1.6 mL, and 1.8 mL of standard solution into a test tube respectively, with distilled water made up to 2.0 mL; 1 mL of phenol solution and 5 mL of concentrated sulphur are added to the test tube sequentially; a 2 mL of distilled water is used to repeat the above colour development operation as a blank control test, and the test tube is shaken well, and then put into the UV spectrophotometer after 30 min of resting, and the absorbance is measured at a wavelength of 490 nm; the standard curve is drawn with the mass concentration of polysaccharide as the horizontal coordinate and the absorbance as the vertical coordinate.
(2) Determination of the content of chondroitin sulfate: 250 μL of chondroitin sulfate extract obtained in Embodiment 1 is quantitatively sucked with a pipette, and it is supplemented to 2 mL with distilled water. Then, 1 mL of phenol and 5 mL of concentrated sulfuric acid are added to it, and fully shaken. After standing for 30 min, it is transferred to an ultraviolet spectrophotometer, and the absorbance is measured at the wavelength of 490 nm. Then, the measured absorbance value is substituted into a standard curve, and sulfuric acid is obtained through conversion.
(3) Calculation of extraction rate of chondroitin sulfate $$W = \frac{c \times \frac{v1}{v2}}{M} \times 100\%$$

where: W—the extraction rate of chondroitin sulfate; c-polysaccharide content measured by substituting the sample to be measured into the absorbance value; $v_1$—the volume of constant volume liquid; $v_2$—the volume of liquid taken during measurement; M-total sugar content in eggshell membrane.

In order to explore the influence of the material-liquid ratio on the extraction rate of chondroitin sulfate in eggshell membrane, Embodiments 2-5 are set up for single factor experiment. The only difference between Embodiments 2-5 and Embodiment 1 is that the material-liquid ratio is 1 g:14 mL, 1 g:15 mL, 1 g:16 mL and 1 g:17 mL in turn.

The extraction rate of chondroitin sulfate extract obtained in Embodiments 1-5 is shown in FIG. 1. From FIG. 1, it is found that the extraction amount of chondroitin sulfate is increasing with the increase of the material-liquid ratio from 1:13 to 1:15. When the material-liquid ratio is 1:15, the extraction amount of chondroitin sulfate reaches the highest point, and the extraction amount is 73.5%. This is because with the increase of material-liquid ratio, the water content in eggshell membrane increases continuously, and the contact area between alkali reagent and salt reagent increases, thus accelerating the extraction of chondroitin sulfate. After the material-liquid ratio reaches 1:15, the tendency of extraction amount of chondroitin sulfate tends to be flat, with no significant increase. The reason for this is that the material-liquid ratio of 1:15 basically enables the extraction of chondroitin sulfate in eggshell membrane to carry out the reaction completely, so after reaching the material-liquid ratio of 1:15, the effect of increasing the material-liquid ratio on the extraction of chondroitin sulfate is not significant, and the optimal material-liquid ratio of 1:15 is selected for the comprehensive consideration to satisfy the needs of the experiment.

In order to explore the influence of extraction temperature on the extraction rate of chondroitin sulfate in eggshell membrane, Embodiments 6-9 are set to carry out single factor experiments on the extraction temperature. The only difference between Embodiments 6-9 and Embodiment 3 is that the extraction temperature is 30° C., 40° C., 60° C. and 70° C. in turn.

Figure 2:
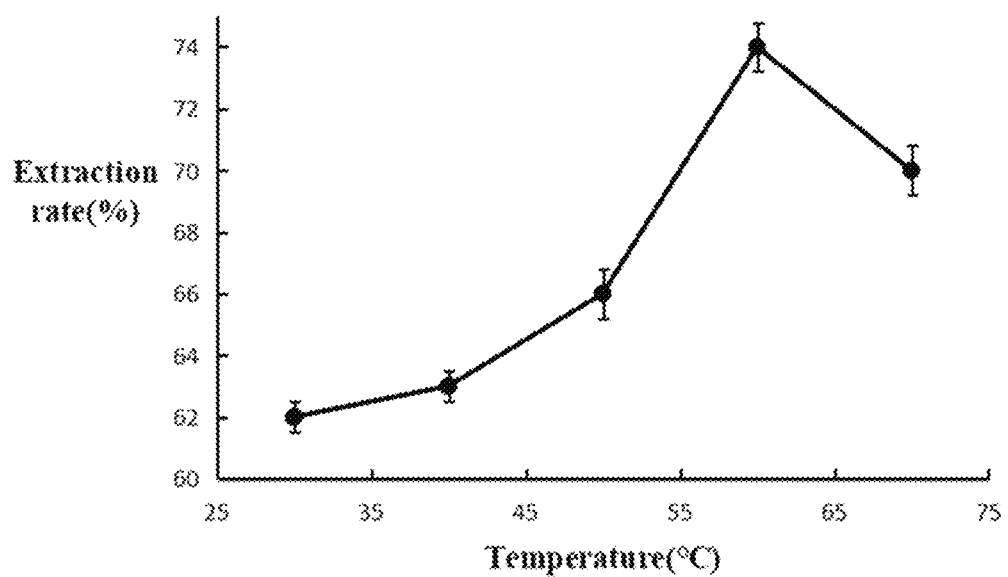
FIG. 2 shows extraction rates of chondroitin sulfate extracts obtained in Embodiment 3 and Embodiments 6-9 of the present disclosure.

The extraction rates of chondroitin sulfate extracts obtained in Embodiment 3 and Embodiments 6-9 are shown in FIG. 2. From FIG. 2, it is found that the extraction rate of chondroitin sulfate increases with the increase of extraction temperature from 30° C. to 60° C., and the extraction rate of chondroitin sulfate reaches the highest at 60° C., which is 74%. This is because the reaction rate in the solution accelerates as the temperature is raised. The optimum reaction temperature is 60° C., where the extraction rate of chondroitin sulfate is the highest, and after reaching 60° C., the extraction rate of chondroitin sulfate tends to level off and decrease slightly when the temperature is increased again. This is due to the fact that too high extraction temperature may lead to changes in the nature of the eggshell membrane, which is not conducive to the extraction of chondroitin sulfate. The extraction temperature of 60° C. is considered to be the optimum temperature for chondroitin sulfate extraction from eggshell membrane.

In order to explore the influence of alkali-salt ratio on the extraction rate of chondroitin sulfate in eggshell membrane, Embodiments 10-13 are set up for single factor test. The only difference between Embodiments 10-13 and Embodiment 8 is that the alkali-salt ratio is 4 mL 1 mL, 5 mL:1 mL, 6 mL:1 mL and 7 mL:1 mL in turn.

Figure 3:
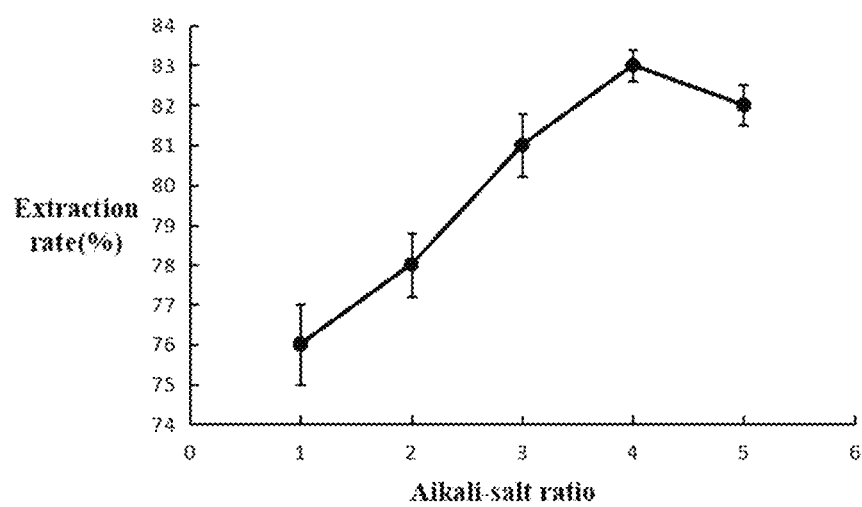
FIG. 3 shows extraction rates of chondroitin sulfate extracts obtained in Embodiment 8 and Embodiments 10-13 of the present disclosure.

The extraction rates of chondroitin sulfate extracts obtained in Embodiment 8 and Embodiments 10-13 are shown in FIG. 3. From FIG. 3, it is found that with the increase of alkali-salt ratio, the extraction rate of chondroitin sulfate first increases and then decreases. When the alkali-salt ratio is increased from 3:1 to 6:1, the extraction rate of chondroitin sulfate is also gradually increased. When the alkali-salt ratio is 6:1, the extraction rate of chondroitin sulfate reaches the highest value of 83.2%, because increasing the alkali concentration properly would promote the rapid alkali hydrolysis and accelerate the extraction of chondroitin sulfate. When the alkali-salt ratio reaches 7:1, the extraction rate of chondroitin sulfate does not increase significantly, and it tends to decrease. This is because the addition of too high alkali-salt ratio will damage the eggshell membrane to a certain extent, resulting in changes in the properties of eggshell membrane, which will affect the extraction of chondroitin sulfate. Considering comprehensively, the alkali-salt ratio of 6:1 is the best.

In order to explore the influence of extraction duration on the extraction rate of chondroitin sulfate in eggshell membrane, Embodiments 14-17 are set up for single factor test. The only difference between Embodiments 14-17 and Embodiment 12 is that the extraction time is 2 h, 4 h, 8 h and 10 h in turn.

Figure 4:
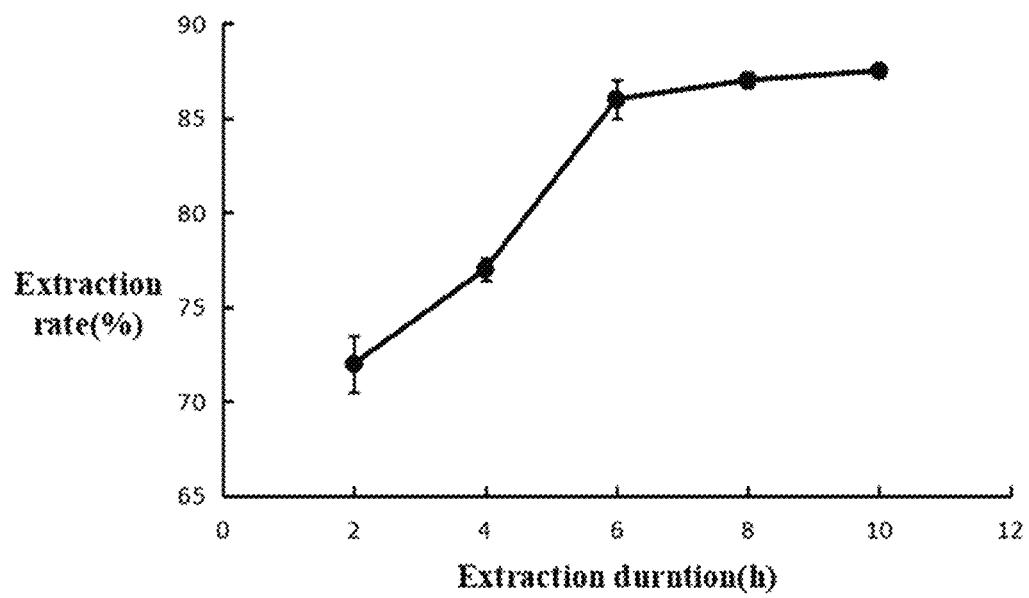
FIG. 4 shows extraction rates of chondroitin sulfate extracts obtained in Embodiment 12 and Embodiments 14-17 of the present disclosure.

The extraction rates of chondroitin sulfate extracts obtained in Embodiment 12 and Embodiments 14-17 are shown in FIG. 4. From FIG. 4, it is found that the extraction rate of chondroitin sulfate gradually increases with the increase of extraction duration. The extraction rate of chondroitin sulfate is significantly improved when the extraction duration is extended from 2 h to 8 h, and the extraction rate is basically the highest at this time when the extraction duration is 8 h, with the extraction rate of 88%. By analyzing the reasons, it is found that proper extension of extraction duration will make chondroitin sulfate in eggshell membrane more completely alkaline, so the promotion of chondroitin sulfate is also significantly improved, and it may be completely extracted in 8 h. At this time, extending the reaction duration has little effect on the extraction rate of chondroitin sulfate, and too long extraction duration may cause microbial pollution and waste the test time. Therefore, the extraction duration of 8 h is controlled to be the optimal extraction duration of chondroitin sulfate by comprehensive considerations.

In order to further optimize the best process parameters for the extraction of chondroitin sulfate from eggshell membrane, Design Expert 10 is used to design a four-factor, three-level response surface test based on the results of the one-factor test, the four factors with greater influence on the material-liquid ratio, extraction temperature, alkali-salt ratio, and extraction duration are optimized for the optimal process parameters using the response surface test, and the amount of chondroitin sulfate extracted is analyzed as a reference index, and the coding of factor levels for the response surface analysis is shown in Table 1.

TABLE 1

Horizontal coding of response surface analysis factors

| Factors | A Material-liquid ratio | B Extraction temperature (° C.) | C Alkali-salt ratio | D Extraction duration (h) |
|---|---|---|---|---|
| −1 | 1:14 | 50 | 5:1 | 6 |
| 0 | 1:15 | 60 | 6:1 | 8 |
| 1 | 1:16 | 70 | 7:1 | 10 |

The design scheme and results of response surface analysis are shown in Table 2.

TABLE 2

Design and results of response surface experiment

| Factors | A Material-liquid ratio | B Extraction temperature (° C.) | C Alkali-salt ratio | D Extraction duration (h) | Extraction rate (%) |
|---|---|---|---|---|---|
| 1 | −1 | 1 | 0 | 0 | 58.35 |
| 2 | 0 | 0 | −1 | 1 | 67.4 |
| 3 | 0 | −1 | 0 | 1 | 69.55 |
| 4 | 0 | 0 | −1 | −1 | 68.75 |
| 5 | −1 | 0 | −1 | 0 | 70.65 |
| 6 | 1 | 0 | −1 | 0 | 53.65 |
| 7 | 0 | 1 | 0 | 1 | 70.8 |
| 8 | 0 | 0 | 0 | 0 | 74.9 |
| 9 | 0 | 0 | 0 | 0 | 76.65 |
| 10 | 0 | −1 | 0 | −1 | 71.95 |
| 11 | −1 | −1 | 0 | 0 | 57.65 |
| 12 | 0 | 0 | 1 | −1 | 72.15 |
| 13 | 0 | 0 | 0 | 1 | 61.15 |
| 14 | 0 | 0 | 0 | 0 | 75.45 |
| 15 | 1 | 0 | 0 | −1 | 62.95 |
| 16 | −1 | 1 | 0 | −1 | 72.95 |
| 17 | 0 | −1 | 1 | 0 | 68.6 |
| 18 | 0 | 0 | 0 | −1 | 73.35 |
| 19 | 0 | 0 | 1 | 0 | 64.3 |
| 20 | 0 | 1 | 0 | 0 | 69.3 |
| 21 | 0 | 0 | 1 | 1 | 65.6 |
| 22 | 0 | −1 | −1 | 0 | 63.15 |
| 23 | 0 | 1 | −1 | 0 | 64.1 |
| 24 | 0 | 0 | 0 | 0 | 76.2 |
| 25 | 0 | 1 | 1 | 0 | 66.15 |
| 26 | 1 | 0 | 0 | 1 | 71.45 |
| 27 | −1 | 0 | 1 | 0 | 60.3 |
| 28 | 1 | −1 | 0 | 0 | 70.25 |
| 29 | 0 | 0 | 0 | 0 | 76.05 |

The data of chondroitin sulfate extracted from eggshell membrane are fitted by multiple regression. The results show that the quadratic multiple regression model of each factor and response surface is $Y=+88.85+5.44\times A+0.042\times B+0.78\times C-1.35\times D-0.41\times AB-3.25\times AC-0.025\times AD-0.85\times BC+0.063\times BD-1.30\times CD-7.69\times A^2-4.01\times B^2-6.26\times C^2-0.86\times D^2$. The regression model is analyzed by variance, and the results are shown in Table 3.

TABLE 3

Analysis of variance of response surface test results

| Analysis of Variance | Sum of Squares | Degrees of Freedom | Mean | F-value | P-value | Significance |
|---|---|---|---|---|---|---|
| Model | 1016.32 | 14 | 72.59 | 62.78 | <0.0001 | ** |
| A | 354.80 | 1 | 354.80 | 306.82 | <0.0001 | ** |
| B | 0.021 | 1 | 0.021 | 0.018 | 0.8951 | |
| C | 7.36 | 1 | 7.36 | 6.37 | 0.0243 | * |
| D | 21.74 | 1 | 21.74 | 18.80 | 0.0007 | ** |
| AB | 0.68 | 1 | 0.68 | 0.59 | 0.4557 | |
| AC | 42.25 | 1 | 42.25 | 36.54 | <0.0001 | ** |
| AD | 2.500E−003 | 1 | 2.500E−003 | 2.162E−0.03 | 0.9636 | |
| BC | 2.89 | 1 | 2.89 | 2.50 | 0.1362 | |
| BD | 0.016 | 1 | 0.016 | 0.014 | 0.9091 | |
| CD | 6.76 | 1 | 6.76 | 5.85 | 0.0298 | * |
| $A^2$ | 383.96 | 1 | 383.96 | 332.03 | <0.0001 | ** |
| $B^2$ | 104.43 | 1 | 104.43 | 90.31 | <0.0001 | ** |
| $C^2$ | 254.39 | 1 | 254.39 | 219.99 | <0.0001 | ** |
| $D^2$ | 4.76 | 1 | 4.76 | 4.11 | 0.0620 | |
| residual | 16.19 | 14 | 1.16 | | | |
| Lack of fit | 14.32 | 10 | 1.43 | 3.07 | 0.1454 | Not significant |
| Error | 1.86 | 4 | 0.47 | | | |
| Total deviation | 1032.51 | 28 | | | | |
| $R^2 = 0.9843$ | | | $R^2$ adj = 0.9686 | | CV = 1.58% | |

The judgement of significance is carried out based on the magnitude of the P-value, where P<0.05 is considered significant and P<0.01 is considered highly significant.

As can be seen from Table 3, the extraction rate of chondroitin sulfate extracted from eggshell membrane is the response value, the model P<0.01, indicating that the quadratic equation is highly significant; the lack of fit P=0.1454>0.05, the lack of fit of the model is not significant, which indicates that the quadratic model is a better fit, and the model coefficient of determination $R^2$ is 0.9843, which indicates that the quadratic model explains 98.43% of the test data, a good test fit with small error, $R^2$adj is 0.9686, both values are higher and closer, indicating that the model has good usability and versatility; the model responds well to changes in the response value of the extraction of chondroitin sulfate and may be used for practical analyses of the extraction of chondroitin sulfate from eggshell membrane. The reliability of the model may be reflected by the variation CV. The lower the variation coefficient, the higher the reliability of the model. The variation coefficient of this experiment is 1.33%, which indicates that the model is more reliable. The effects of various factors on the extraction of chondroitin sulfate from eggshell membrane are A>D>C>B, that is, the material-liquid ratio>extraction time>alkali-salt ratio>extraction temperature.

Figure 5:
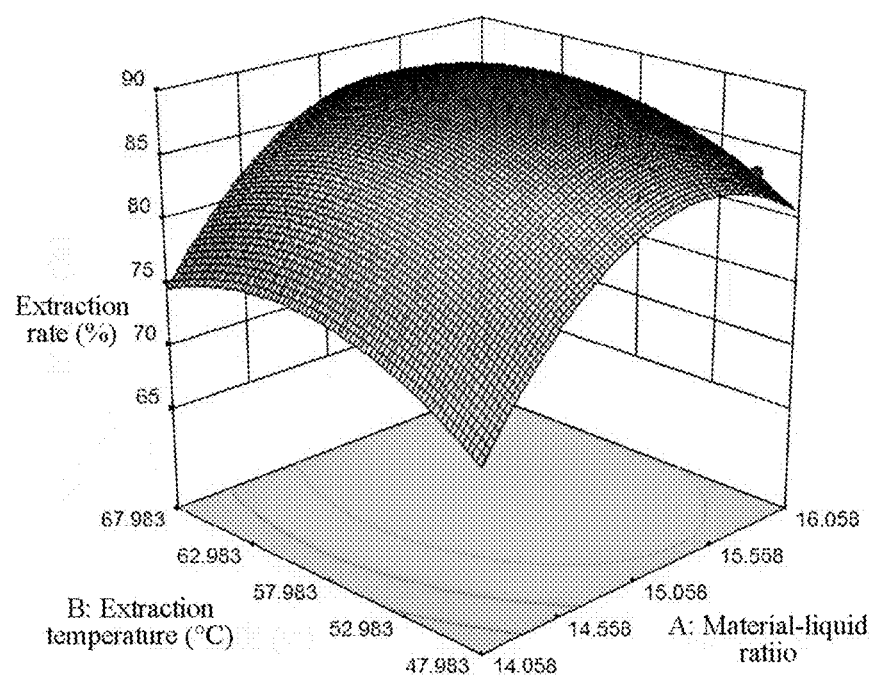
FIG. 5 is a response surface diagram of an interaction between material-liquid ratio and extraction temperature.
Figure 6:
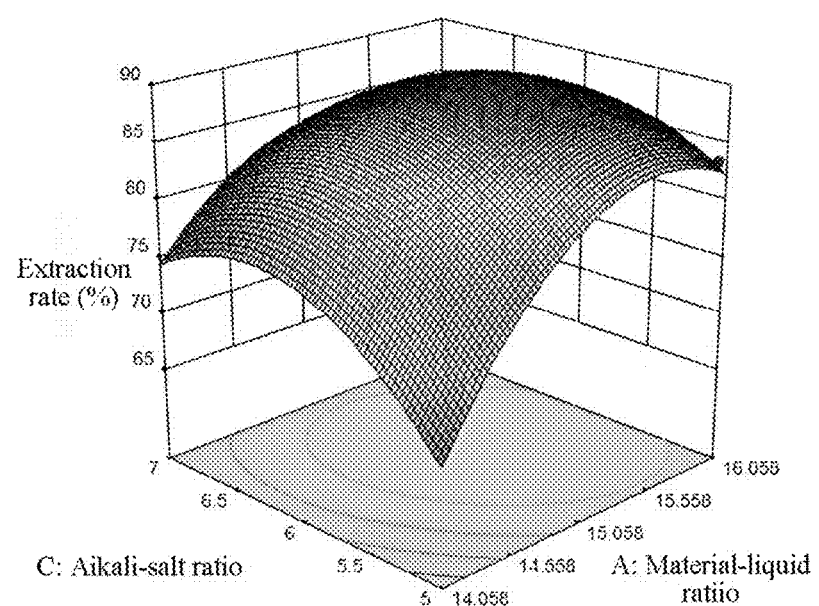
FIG. 6 is a response surface diagram of an interaction between solid-liquid ratio and alkali-salt ratio.
Figure 7:
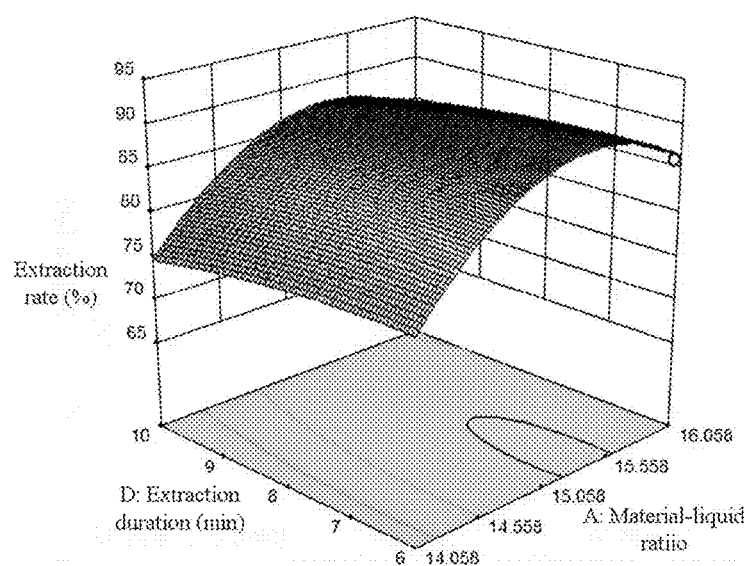
FIG. 7 is a response surface diagram of an interaction between material-liquid ratio and extraction duration.
Figure 8:
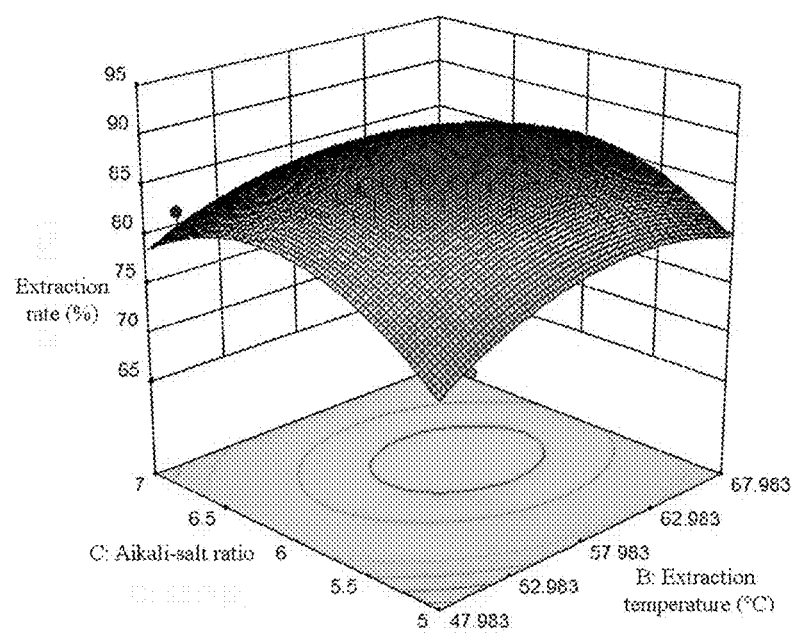
FIG. 8 is a response surface diagram of an interaction between extraction temperature and alkali-salt ratio.
Figure 9:
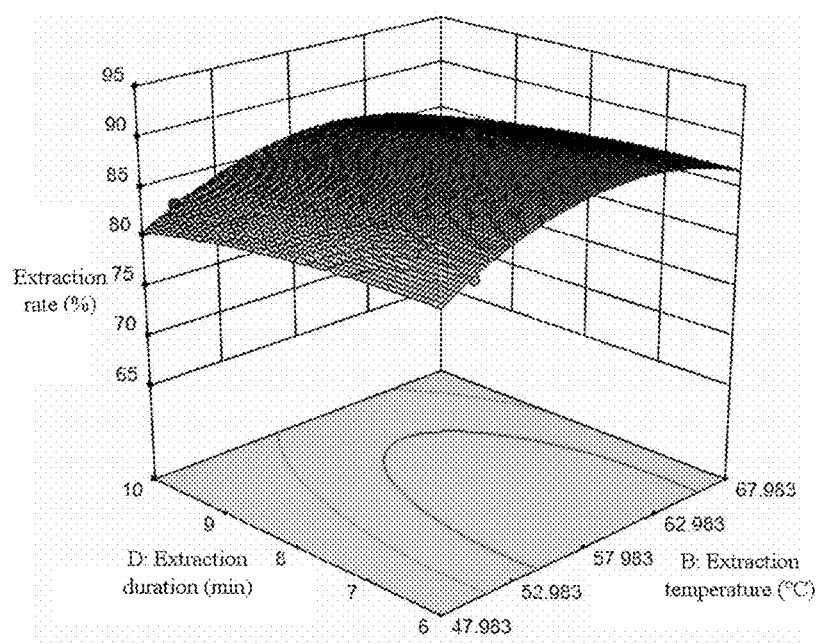
FIG. 9 is a response surface diagram of an interaction between extraction temperature and extraction duration.
Figure 10:
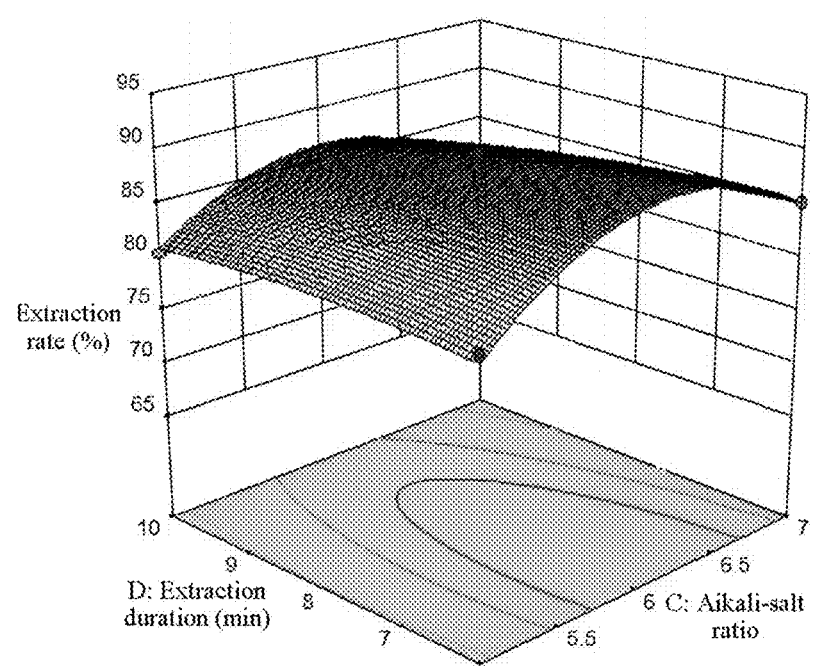
FIG. 10 is a response surface diagram of an interaction between alkali-salt ratio and extraction duration.

The 3D response surface diagram of interaction of various factors is shown in FIGS. 5-FIG. 8, in which FIG. 5 is the response surface diagram of an interaction between material-liquid ratio and extraction temperature, FIG. 6 is the response surface diagram of the interaction between material-liquid ratio and alkali-salt ratio, FIG. 7 is the response surface diagram of the interaction between alkali-salt ratio and extraction duration, FIG. 8 is the response surface diagram of the interaction between alkali-salt ratio and extraction temperature.

The regression model may be described intuitively from the response surface 3D diagrams in FIG. 5, FIG. 6, FIG. 7 and FIG. 8, the closer the contour graph is to the circle, the weaker the interaction between the two variables, and the closer the contour is to the ellipse, the stronger the interaction between the two variables. The order of influence of interaction among various factors on the extraction of chondroitin sulfate from eggshell membrane is AC>CD>BC>AB>BD>AD, that is, the interaction between material-liquid ratio and alkali-salt ratio>the interaction between alkali-salt ratio and extraction duration>the interaction between extraction temperature and alkali-salt ratio>the interaction between material-liquid ratio and extraction temperature>the interaction between extraction temperature and extraction duration>the interaction between material-liquid ratio and extraction duration. Relatively speaking, the interaction surface between A (material-liquid ratio) and C (alkali-salt ratio) is steepest in this experiment, which indicates that the increase of material-liquid ratio has a significant influence on the alkali-salt ratio in the experiment of extracting chondroitin sulfate (P<0.01). The interaction of AC reaches a very significant level (P<0.01) and that of CD reaches a significant level (P<0.05).

The optimal process for extracting chondroitin sulfate from eggshell membrane is predicted and analyzed by the regression model as follows: the material-liquid ratio is 1:15.439, the extraction temperature is 58.12° C., the alkali-salt ratio is 5.823:1, and the extraction duration is 7.258 h. At this time, the extraction rate of chondroitin sulfate reaches up to 89.826%.

Verification Experiment

When the crude eggshell membrane is 1 g, the material-liquid ratio is 1:15.5, the extraction temperature is 59° C., the alkali salt ratio is 6:1, and the extraction duration is 7.3 h. Under these conditions, the extraction rate of chondroitin sulfate reaches up to 89.85%, and the theoretical value is not much different from the actual value with a good fit and a relative error of <0.5%, which demonstrates that the verification experiments show that the process parameters obtained by using the response surface are reliable and credible.

Comparative Embodiment 1

Compared with Embodiment 11, the difference is that the state of eggshell membrane is pure hand-torn eggshell membrane, and the preparation method of pure hand-torn eggshell membrane is that fresh eggshell is soaked in distilled water for 2 hours, then the eggshell film attached to the inner wall of eggshell is manually torn off, collected, and placed in a blast drying oven at 50° C. for 2 hours to obtain the pure hand-torn eggshell membrane.

Comparative Embodiment 2

Compared with Embodiment 11, the difference is that the state of eggshell membrane is ordinary crushed eggshell membrane, and the preparation method of ordinary crushed eggshell membrane is that the dried hand-torn eggshell membrane is put in a high-speed crusher and crushed for 30 seconds, and the ordinary crushed eggshell film is obtained through a 60-mesh sieve.

The extraction rate of chondroitin sulfate extract prepared in Embodiments 1-2 is tested, and the test results are shown in Table 4.

TABLE 4

Effects of different eggshell membranes on the extraction rate of chondroitin sulfate

| | Different eggshell membranes | Extraction rate (%) |
|---|---|---|
| Comparative embodiment 1 | Hand-torn eggshell membrane | 53.5 |
| Comparative embodiment 2 | Ordinary crushed eggshell membrane | 72.6 |
| Embodiment 11 | Ultramicro-pulverized eggshell membrane | 85.1 |

As can be seen from Table 4, under the same conditions, the extraction rate of chondroitin sulfate from hand-torn eggshell membrane is the lowest, followed by ordinary crushing, and the extraction rate from ultramicro-crushed eggshell membrane is the highest. This is because with the reduction of the particle size of the eggshell membrane, the specific surface area of the particles is increasing, and the contact area of alkali reagents with the eggshell membrane is also increasing, which promotes the breakage of the chemical bond between the chondroitin sulfate and proteins, and leads to a better release of chondroitin sulfate, and therefore, it is optimal to use the ultramicrocrushed eggshell membrane for the extraction of chondroitin sulfate.

The above describes only preferred embodiments of the present disclosure, and the scope of protection of the present disclosure is not limited to this. Any person familiar with the technical field who makes an equivalent replacement or change within the technical scope disclosed by the present disclosure according to the technical scheme and inventive concept of the present disclosure should be included in the scope of protection of the present disclosure.

What is claimed is:

1. A method for extracting chondroitin sulfate from eggshell membrane, comprising following steps: adding a mixed reagent into ultramicro-pulverized eggshell membrane, followed by water bath extraction; and centrifuging an extractive solution to obtain the chondroitin sulfate;

the mixed reagent is a mixed solution of alkali reagent and salt reagent, wherein the alkali reagent is a sodium hydroxide solution with a volume fraction of 2%, and the salt reagent is a 2% sodium chloride solution by volume;

an alkali-salt ratio of the alkali reagent to the salt reagent is 6 mL:1 mL;

a material-liquid ratio of the mixed reagent to the ultra-micro-pulverized eggshell membrane is 1 g:15.5 mL;

a temperature of the water bath extraction is 59° C. and a duration is 7.3 h.

2. The method for extracting chondroitin sulfate from eggshell membrane according to claim 1, wherein a preparation method of the ultramicro-pulverized eggshell membrane comprises:

(1) soaking eggshells in water, then tearing off eggshell membranes attached to inner walls of the eggshells, and collecting for later use; and (2) drying, crushing, sieving and ball milling the eggshell membranes collected in the step (1) to obtain the ultramicro-pulverized eggshell membrane.

3. The method for extracting chondroitin sulfate from eggshell membrane according to claim 2, wherein in the step (1), a soaking duration is 2 h; in the step (2), a drying temperature is 50° C. and a drying duration is 2 h; a crushing duration is 30 s; the sieving comprises sieving through a 60-mesh sieve; a ball-to-material ratio of the ball milling is 7:1, a rotating speed is 500×g, and a ball milling duration is 180 min.

4. The method for extracting chondroitin sulfate from eggshell membrane according to claim 1, wherein a rotational speed of the centrifuging is 4000×g and a duration is 10 min.

\* \* \* \* \*